(12) United States Patent
Xu et al.

(10) Patent No.: US 9,334,405 B2
(45) Date of Patent: May 10, 2016

(54) CHROMIUM-FREE INSULATION COATING MATERIAL FOR NON-ORIENTED SILICON STEEL

(75) Inventors: Yunpeng Xu, Shanghai (CN); Yongjie Yang, Shanghai (CN); Dengfeng Li, Shanghai (CN); Yaming Ji, Shanghai (CN); Zipeng Zhao, Shanghai (CN); Lingyun Chen, Shanghai (CN); Xiao Chen, Shanghai (CN); Jie Huang, Shanghai (CN)

(73) Assignee: Baoshan Iron & Steel Co., LTD., Shanghai (CN)

( * ) Notice: Subject to any disclaimer, the term of this patent is extended or adjusted under 35 U.S.C. 154(b) by 355 days.

(21) Appl. No.: 13/818,258

(22) PCT Filed: Apr. 13, 2011

(86) PCT No.: PCT/CN2011/072727
§ 371 (c)(1),
(2), (4) Date: Apr. 12, 2013

(87) PCT Pub. No.: WO2012/041052
PCT Pub. Date: Apr. 5, 2012

(65) Prior Publication Data
US 2013/0203896 A1      Aug. 8, 2013

(30) Foreign Application Priority Data
Sep. 29, 2010    (CN) .......................... 2010 1 0296557

(51) Int. Cl.
| C09D 5/00 | (2006.01) |
| C09D 5/08 | (2006.01) |
| C09D 7/12 | (2006.01) |
| C09D 163/00 | (2006.01) |
| H01B 3/40 | (2006.01) |

(52) U.S. Cl.
CPC ........ C09D 5/00 (2013.01); C09D 5/084 (2013.01); C09D 7/1216 (2013.01); C09D 163/00 (2013.01); H01B 3/40 (2013.01)

(58) Field of Classification Search
CPC .................................. C08L 63/00; C09D 5/00
USPC ........................................................ 523/451
See application file for complete search history.

(56) References Cited

U.S. PATENT DOCUMENTS

| 5,364,899 | A * | 11/1994 | Watanabe ............ | C08K 3/0033 524/268 |
| 2006/0141230 | A1 * | 6/2006 | Miyoshi et al. ............... | 428/216 |
| 2012/0171470 | A1 * | 7/2012 | Cavallin et al. ............... | 428/335 |
| 2013/0115472 | A1 * | 5/2013 | Yu .......................... | C08L 65/00 428/463 |
| 2014/0213729 | A1 * | 7/2014 | Hongo ......................... | 525/122 |

FOREIGN PATENT DOCUMENTS

| CN | 101486866 A | 7/2009 |
| CN | 101560342 A | 10/2009 |
| CN | 101659799 A | 3/2010 |
| WO | 01/68778 | 9/2001 |

OTHER PUBLICATIONS

English machine translation of CN 101560342. Original reference published Oct. 21, 2009. Translation printed Mar. 31, 2015.*
The International Search Report as mailed on Jul. 21, 2011 for International Application No. PCT/CN2011/072727.

* cited by examiner

Primary Examiner — Megan McCulley
(74) Attorney, Agent, or Firm — Quarles & Brady, LLP

(57) ABSTRACT

The present invention refers to a chromium-free insulation coating material for non-oriented silicon steel, comprising, in parts by weight, the following components: metal dihydrogen phosphate salt of 100 parts, epoxy resin of 10~60 parts, naphthenate drier or isooctanoate metal salt drier of 0.001~10 parts, organic solvent of 0.001~100 parts and pure water of 60~2000 parts. The metal dihydrogen phosphate salt is $Al(H_2PO_4)_3$, $Mg(H_2PO_4)_2$, $Ca(H_2PO_4)_2$ or $Zn(H_2PO_4)_2$; the epoxy resin is water-soluble epoxy resin or epoxy resin emulsion. Chromium-free insulation coating material of the present invention, after being coated on non-oriented silicon steel, renders highly transparent appearance, and has excellent insulativity, corrosion resistance, adhesiveness, weldability and manufacturability, so as to eliminate defects of the existing chromium-free coating, such as sticky and un-wear-resistant and to meet environment protection requirements.

14 Claims, No Drawings

CHROMIUM-FREE INSULATION COATING MATERIAL FOR NON-ORIENTED SILICON STEEL

CROSS-REFERENCES TO RELATED APPLICATIONS

This application represents the U.S. national phase entry of PCT International Application No. PCT/CN2011/072727 filed Apr. 13, 2011, and claims the benefit of Chinese Patent Application No. 201010296557.6 filed on Sep. 29, 2010, incorporated by reference herein.

FIELD OF THE INVENTION

This invention relates generally to manufacture of non-oriented silicon steel, more particularly, to a chromium-free insulation coating material for non-oriented silicon steel.

BACKGROUND

Electric steel is a ferro-silicon soft magnetic alloy with extremely low carbon content, which is mainly used in manufacture of electric motors, generators, transformer iron cores and so on. Iron loss of the electric steel is a leading indicator to measure properties of the electric steel product. Iron loss mainly includes three portions, i.e., hysteresis loss, eddy current loss and abnormal loss. In subsequent processes, the non-oriented silicon steel is usually punched into core-shaped blanks, which, after being stacked up, are secured together by welding or riveting.

In general, surfaces of the non-oriented silicon steel sheet need to have an insulation coating so as to provide a high-level interlaminate resistance. This resistance can minimize eddy current loss of a stator, after the silicon steel sheets are punched and stacked to form the stator material. The insulation coating is usually called non-oriented coating. The non-oriented coating shall have a good adhesiveness, in order to ensure the insulation coating will not be peeled off from edges of the silicon steel sheets while they are punched into blanks. When being punched, slotted and/or cut, the insulation coating shall not pulverize excessively, so as to prevent some pulverized materials from accumulating on feed rollers or other devices to wear out moulds for punching or cutting the blanks. Meanwhile, the insulation coating shall allow welding the iron core at a reasonable rate.

The insulation coating applied on the surfaces of the non-oriented silicon steel can be divided into organic coating, inorganic coating and organic-inorganic composite coating, among which the organic-inorganic composite coating has both advantages of pure organic coating with good punchability and advantages of pure inorganic film with good heat resistance and weldability, and therefore can meet requirements of most users and thus is widely applied.

For example, U.S. Pat. No. 4,844,753 disclosed a solution for forming insulation coating on electric steel sheet, which consists of a film-forming component of inorganic chromate and a resin component. The resin component is a mixture of acrylic acid or acrylic acid-styrene copolymer emulsion and melamine resin of 0.2~1 μm granularity. U.S. Pat. No. 4,618,377 disclosed an organic/inorganic coatings composition for forming insulation coating on surface of electric steel, which includes one type of organic resin, one type of resin particles that is improved with dispersant, and one type of solutions that contains at least one type of inorganic phosphate or chromate composite. Korean patent KR25106, 31208, 31219, U.S. Pat. No. 4,316,751, U.S. Pat. No. 4,498,936, and Japanese patent publication JP昭 50-15013 all disclosed a manufacture method of chromium-containing organic-inorganic insulation coating. However, the formulas in these patents all utilize oxides of chromium or chromates. The chromates, due to carcinogenicity, are restricted more and more severely for usage, as the requirements for environmental protection are increasingly strict.

In view of the above reasons, formula of chromium-free insulation coating for non-oriented silicon steel develops rapidly. Ordinary chromium-free semi-organic coating is introduced phosphates to take the place of bichromates. Phosphate coating has good insulativity and heat resistance, but trends to cause overwear to molds when punching stacked blanks, and thus reduce corrosion resistance and adhesiveness of the coating thanks to lack of chromates. For example, U.S. Pat. No. 2,743,203 disclosed that good insulation film can be obtained from a solution containing 7~50% free phosphoric acid or from a phosphoric acid solution with dissolved magnesia therein. U.S. Pat. No. 4,496,399 refers to an inorganic/organic phosphate insulation coating. The inorganic part in its ingredients is aluminum and magnesium phosphate, colloid silicon dioxide and chromium acid anhydride, or a sort of aluminum silicate particles, while the organic part is emulsion of acrylic acid or ethylene acetate. Disadvantage of such coating lies in that the inorganic part contains free phosphoric acid, which will react with steel surfaces at high temperature, and magnesium phosphate has to be solidified at high temperature to prevent the blanks from adhering together, but resin trends to decompose, which renders the coating brown. Meanwhile, usage of chromium acid anhydride is not environment-friendly.

Japanese patent publication JP昭 2004-322079 disclosed a method for improving corrosion resistance of a coating by using compound phosphate with particularly proportioned aluminum phosphate, magnesium phosphate and calcium phosphate. Due to the usage of phosphate in such coating, excessive residual phosphoric acid therein is easy to cause adhesion of blanks. Japanese patent publication JP昭 11-131250 and Korean patent KR1999-26912 disclosed that siliane coupling agent is adopted to prevent interlaminate adhesion caused by residual phosphoric acid. Korean patent KR1999-26912 and Japanese patent publication JP昭 3370235 disclosed that silicon oxide sol, aluminum oxide sol, zirconia micro-particles, etc., are adopted to obtain non-oriented silicon steel insulation coating with high-corrosion-resistance and good-adhesiveness. These formulas with phosphates and inorganic sols as host agents still have the problem of interlaminate adhesion because of presence of phosphates, and the problem of low corrosion resistance because of presence of colloidal silicon oxide.

For chromium-free semi-organic coating using phosphate as host agent, for the reason of residual phosphoric acid, it is extremely prone to bring about interlaminate adhesion problem. European patent EP1208166B1 utilizes a insulation coating liquid with aluminum dihydrogen phosphate of 100 shares, acrylic acid-styrene emulsion of 28-98 shares, zinc nitrate of 6-18 parts by weight, silicon compound of 4-13 parts by weight, glycol of 18-35 parts by weight and non-ionic surfactant of 3-11 parts by weight, which presents water absorptivity since it has no stabilizer of residual phosphoric acid. Further, by using zinc nitrate, the presence of nitrate ions has remarkable adverse effects on corrosion resistance. In U.S. Pat. No. 5,955,201, inorganic silicate particles are employed as stabilizer for the residual phosphoric acid, so that the problem of interlaminate adhesion is effectively overcome. But, inorganic silicate particles can not dissolve into solution system, and thus trends to precipitate. They are hard to show effects in absence of fully mixing. The patent WO2008/016220A1 disclosed that by utilizing cobalt hydroxide and strontium hydroxide as stabilizer for residual phosphoric acid, the problem of interlaminate adhesion might be overcome as well, but the two are inorganic particles that are hard to be mixed well.

At present, the chromium-free coatings produced and used in China have a less portion of inorganic ingredients. Although such coatings have a good-looking appearance and good punchability, the high temperature resistance thereof is poor, so that, after a high temperature treatment, interlaminate current resistance and insulativity of the coatings will be lowered greatly, and the coatings are easy to carburize, resulting in degradation of product performance.

Non-oriented silicon steels are divided into so-called white sheets and black sheets, depending on whether the steels are stress-relief annealed. In application fields of non-oriented silicon steel, such as medium and small-sized electric machines and EI (electric instrument) sheets, it is required to have the coatings being stress-relief annealed, to reduce iron loss of the silicon steel sheets and to improve electrical properties. Users of these fields usually put forward such a requirement that the coating of the non-oriented silicon steels present a raven-but-brilliant appearance after the stress-relief annealing process. If the coatings are lusterless after being stress-relief annealed, they are considered to have been improperly annealed and have poor insulativity, which then will be prone to be rejected by downstream users. The above-mentioned chromium-free coatings are all lusterless after being stress-relief annealed, and therefore fail to meet user's requirements.

Therefore, it is especially required to develop a semi-organic environment-friendly insulation coating for cold-rolled non-oriented electric steel to provide the non-oriented silicon steel sheets with good surface resistivity, lowered eddy current loss and good moisture absorption resistance, together with good adhesiveness, so that the coating will not pulverize during being cut into strips and punched to protect moulds; and the coating will not generate excessive air holes during welding process and not react with various refrigerants and frozen engine oil used in compressor; and the coating will not generate harmful matters, such as sexavalent chromate, during production and operation.

EU Commission and European Parliament issued two standard directives on Feb. 13, 2003, i.e., the directive on wastes of electric and electronic equipment (WEEE) and the directive on restriction of harmful substances (ROHS) in electric and electronic equipment, which require that index of harmful substances in electric and electronic products sold in the EU market must conform to relevant prescriptions from Jul. 1, 2006 onwards. The restricted harmful substances include: cadmium, lead, mercury, sexavalent chromate, multi-bromine biphenyl, polymerized biphenyl bromate and ether, etc.

SUMMARY

The object of the present invention is to provide a chromium-free insulation coating material for non-oriented silicon steel. The coating adopts naphthenate and isooctanoate salt as drier to effectively prevent the chromium-free insulation coating from clamminess. Meanwhile, black sheet of the coating presents raven-but-brilliant appearance, and thus is acceptable for downstream users. The coating of the present invention is a new-type non-oriented silicon steel chromium-free insulation coating material having wide application prospect.

For the above object, the invention utilizes the following technical solutions.

A chromium-free insulation coating material for non-oriented silicon steel comprises, in parts by weight, the following components:

| | |
|---|---|
| Metal dihydrogen phosphate salt | 100 parts; |
| Epoxy resin | 10~60 parts; |
| Naphthenate drier or isooctanoate metal salt drier | 0.001~10 parts; |
| Organic solvent | 0.001~100 parts; |
| Pure water | 60~2000 parts. |

The above-mentioned metal dihydric phosphate, which is used in chromium-free coating liquid to improve heat resistance and corrosion resistance of insulation coating, can be obtained by mixing metal hydroxides or oxides with phosphoric acid. The general chemical formula is $M(H_2PO_4)n$, wherein n is valence of metal ion M. The metal dihydric phosphates frequently used include $Al(H_2PO_4)_3$, $Mg(H_2PO_4)_2$, $Ca(H_2PO_4)_2$, $Zn(H_2PO_4)_2$ and so on. As to $Al(H_2PO_4)_3$, molar ratio of $Al_2O_3$ to $H_3PO_4$ therein is 0.14~0.20:1; as to divalent metal phosphate such as $Mg(H_2PO_4)_2$, $Ca(H_2PO_4)_2$ or $Zn(H_2PO_4)_2$, molar ratio of MO (metal oxide) and $H_3PO_4$ therein is 0.40~0.60:1. Generally speaking, when ratio between metal oxide and phosphoric acid is below a lower limit, there will be too much residual phosphoric acid in the solution, so that stickiness of the insulation coating degrades to be unusable; and when the ratio is above an upper limit, the solution would be unstable. Such metal dihydric phosphates can be used alone or in combination.

The above-mentioned epoxy resin might be epoxy resin emulsion or water-soluble epoxy resin solution, for example, epoxy resin emulsions E51, E44, E20 produced and sold by Shanxi BOAO Chemicals Co. Ltd., or water-soluble epoxy resins 681, 682, 811 produced and sold by Yingkou XING-HUO Chemicals Co. Ltd. The epoxy resin, acting as organic component in the coating solution, improves adhesiveness and toughness of the insulation coating, and prevents the coating from peeling off from substrate. Epoxy resins are divided into two types, i.e., water-soluble type and water-insoluble type. With regard to water-insoluble epoxy resin, it can be configured to join in the form of emulsion, while epoxy resin of other kind can be solved directly into water via certain improved means, and such kind of epoxy resin is applicable to chromium-free coating solution directly. If content of substances of this kind is too low in the coating formula, the insulation coating will be too coarse and trend to peel off and to pulverize, and then adhesiveness of the coating cannot be guaranteed; whereas, if the content is too high, the heat resistance and weldability of the insulation coating will be degraded. Additive amount of the epoxy resin emulsion is 10~60 parts by weight, and preferably 8~60 parts (on the basis of metal dihydric phosphate of 100 parts by weight).

The above-mentioned drier is a coating additive. In German Standard DIN 55901, drier is defined as follows: "drier is an organic metal compound, called dry stuff in a solution, which is soluble in organic solvents and resins. Chemically, it belongs in the category of metal soup (i.e., higher aliphatic acid metal salt), which shorten drying time, i.e., accelerating curing speed when being added in unsaturated oils and resins. The driers are usually divided into the following categories: 1) primary driers, which are, generally, metal soups containing plural oxidation valence states and being able to occur redox reaction; driers of this category commonly used in industry include metal soups of cobalt, manganese, vanadium and cerium; 2) secondary driers, which are metal soups existing in a single oxidation valence state, e.g., metal soups of calcium, kalium, barium and zinc, and have no drying effect per se but take the drying effect only when being used in conjunction with the primary driers; 3) coupling driers, for example metal soup of zirconium, the mechanism for acceleration reaction process of which is on the basis of a reaction between metals and hydroxyl groups or carboxyl groups in resins.

The driers in the invention might be common metal naphthenates, e.g. cobalt, manganese, ferro, cuprum, cerium, zinc, calcium, kalium, barium or nickel naphthenate; or can be metal isooctanoate metal salt, such as kalium, manganese, natrium, nickel, cuprum, cerium, zinc, zirconium or calcium isooctanoate salt. Such kind of substances might be used separately or combinationally in chromium-free coating liquid for catalyzing cross-linking reaction of resins to speed up film formation, and meanwhile to advance hardness and wearability of the coating. Additive amount of the driers is 0.001~10 parts by weight (on the basis of metal dihydric phosphate of 100 parts by weight).

The above-mentioned organic solvents might be glycol or glycerol. Such kind of substances are mutually soluble in water and are capable to dissolve driers such as naphthenate and isooctanoate salt therein, in order to reduce surface tension of the solution and prevent coating layer from defects like shrinkage cavities and miss prints. Additive amount of the organic solvents is 0.001~100 parts by weight (on the basis of metal dihydric phosphate of 100 parts by weight).

Water, acting as main solvent, plays a role of regulating proportion within the coating material of the invention to facilitate overlaying process. Additive amount of the water is 60~2000 weight shares (on the basis of metal dihydric phosphate of 100 weight shares).

The five components above are mixed in accordance with the said proportions to form a homogeneous solution, i.e., chromium-free coating liquid solution. The mixed solution might be applied to various coating machine systems directly.

Thickness specifications of the non-oriented silicon steel sheets might be various specifications of 0.20 mm, 0.35 mm, 0.50 mm, 0.65 mm, etc. After a cold-rolling process, the foresaid non-oriented silicon steel sheets need be annealed after surface cleaning, and then be subject to post cleaning, and finally it will be fed into a roller coater for overlay of chromium-free coating. The roller coater can be of two-roller type or three-roller type, and there is no limit on whether its coating roller is slotted. Temperature of steel strip in drying-by-fire section is in the range of 200~350° C. If the temperature is too low, then the coating material will react incompletely and thus is sticky and lack-of-due-strength; and if the temperature is too high, then epoxy resin decomposes and the coating overburns to yellow.

Beneficial Effects

Chromium-free insulation coating material of the present invention, after being coated on non-oriented silicon steel, renders highly transparent appearance, and has excellent insulativity, corrosion resistance, adhesiveness, weldability and manufacturability, so as to eliminate defects of the existing chromium-free coating, such as sticky and un-wear-resistant and to meet environment protection requirements.

The invention's chromium-free insulation coating material is applicable to high-grade and high-efficient non-oriented electric silicon steel products, and also applicable to medium and low grade ones. The coating material liquid can be overlaid on a cold-rolled silicon steel substrate by a roll coater, and baked to form a film. Therefore, it might be widely spread to non-oriented silicon steel manufacturers at home and abroad.

DETAILED DESCRIPTION

The invention is now described in detail in connection with specific embodiments, but protection scope of the invention is not limited by embodiments herein.

Embodiments 1~6

1) Formula (In parts by weight) includes: aluminum dihydrogen phosphate, naphthenate drier, water-soluble epoxy resin, glycol and pure water, as shown in Table 1.

2) Preparation and application: mixing the above components at room temperature, and then agitating the mixture at a low speed by a agitator to form a homogeneous solution; applying the solution onto surfaces of non-oriented silicon steel sheets of 0.5 mm thickness by a roller coater under application rate of 1.8 g/m$^2$, baking to form films using a flame baking furnace at sheet temperature of 200~500° C. Performance results of the coatings are shown in Table 2.

TABLE 1

| | Formulas | | | | |
|---|---|---|---|---|---|
| No. | aluminum dihydrogen phosphate | water-soluble epoxy resin | glycol | naphthenate drier | pure water |
| embodiment 1 | 100 | 681, 30 | 10 | cobalt naphthenate, 8 | 80 |
| embodiment 2 | 100 | 682, 40 | 50 | calcium naphthenate, 2 | 60 |
| embodiment 3 | 100 | 811, 50 | 30 | zinc naphthenate, 10 | 500 |
| embodiment 4 | 100 | 811, 20 | 5 | manganese naphthenate, 1 | 1000 |
| embodiment 5 | 100 | 681, 10 | 0.001 | cobalt naphthenate, 0.001 | 300 |
| embodiment 6 | 100 | 682, 15 | 5 | ferro naphthenate, 7 | 700 |
| comparative object 1 | chromium-containing insulation coating, its formula: chromate + cinepazid copolymer emulsion + boric acid + glycerin | | | | |

TABLE 2

| No. | Adhesiveness, Φ = 20 cm | Burs in punchability, 50 μm | Weldability, cm/min | Appearance | Corrosion resistance | Interlaminate resistance, Ω·cm² per sheet |
|---|---|---|---|---|---|---|
| Embodiment 1 | A little peeling off | >1.5 million times | ≤40 | Brilliant surface | 15% | 30 |
| Embodiment 2 | No peeling off | >1.7 million times | ≤30 | Brilliant surface | 25% | 45 |
| Embodiment 3 | No peeling off | >1.6 million times | ≤50 | Brilliant surface | 15% | 25 |
| Embodiment 4 | No peeling off | >1.7 million times | ≤40 | Brilliant surface | 10% | 48 |
| Embodiment 5 | No peeling off | >1.8 million times | ≤60 | Brilliant surface | 20% | 36 |
| Embodiment 6 | No peeling off | >1.6 million times | ≤50 | Brilliant surface | 10% | 42 |
| Comparative object 1 | A little peeling off | >1.4 million times | ≤10 | Smooth surface | 40% | 15 |

The various performance testing conditions are listed as follows (similarly hereinafter):

Adhesiveness test: GB 2522-88 (National Standard in China);

Punchability test: punching times when burr height >50 μm;

Weldability test condition: Tungsten Inert Gas (TIG) welding, with current value of 120 A, electrode material of Th—W, argon flow rate of 6 L/min and pressure 50 kg/cm²;

Corrosion resistance test: JIS Z2371;

Interlaminate resistance test: JIS C2550;

As can be seen from Table 2, the performances of the coating formed from chromium-free insulation coating material of the present invention are excellent.

Embodiments 7~13

1) Formula (In parts by weight) includes: dihydrogen phosphate (aluminum dihydrogen phosphate, magnesium dihydrogen phosphate, calcium dihydrogen phosphate or zinc dihydrogen phosphate), epoxy resin emulsion (by dry weight shares), isooctanoate metal salt drier, glycerol and pure water, as shown in Table 3.

2) Preparation and application: mixing the above components at room temperature, and then agitating the mixture for 10 min by a magnetic agitator; applying the agitated mixture onto surfaces of non-oriented silicon steel sheets of 0.5 mm thickness by a roller coater under application rate of 1.8 g/m², baking to form films using a flame baking furnace at sheet temperature of 200~500° C. Performance results of the coatings are shown in Table 4.

TABLE 3

| | Formulas | | | | |
|---|---|---|---|---|---|
| No. | dihydrogen phosphate | epoxy resin emulsion | glycerol | isooctanoate metal salt drier | pure water |
| embodiment 7 | magnesium dihydrogen phosphate, 100 | E51, 10 | 0.01 | manganese isooctanoate, 1 | 700 |
| embodiment 8 | calcium dihydrogen phosphate, 100 | E44, 35 | 100 | cobalt isooctanoate, 0.5 | 900 |
| embodiment 9 | aluminum dihydrogen phosphate, 100 | E20, 15 | 80 | calcium isooctanoate, 5 | 1500 |
| embodiment 10 | zinc dihydrogen phosphate, 100 | E44, 60 | 50 | Cerium isooctanoate, 2 | 1900 |
| embodiment 11 | magnesium dihydrogen phosphate, 100 | E51, 50 | 40 | cobalt isooctanoate, 8 | 300 |
| embodiment 12 | zinc dihydrogen phosphate, 100 | E20, 45 | 10 | Zinc isooctanoate, 10 | 400 |
| embodiment 13 | aluminum dihydrogen phosphate, 100 | E44, 30 | 2 | Cerium isooctanoate, 5 | 200 |
| comparative object 2 | chromium-containing insulation coating, its formula: chromate + cinepazid copolymer emulsion + boric acid + glycerin | | | | |

TABLE 4

| No. | Adhesiveness, Φ = 20 cm | Burs in punchability, 50 μm | Weldability, Cm/min | Appearance | Sticky surface | P separation out, μg/100 m² |
|---|---|---|---|---|---|---|
| Embodiment 7 | No peeling off | >2.0 million times | ≤55 | Smooth surface | No | 15 |

TABLE 4-continued

| No. | Adhesiveness, Φ = 20 cm | Burs in punchability, 50 μm | Weldability, Cm/min | Appearance | Sticky surface | P separation out, μg/100 m² |
|---|---|---|---|---|---|---|
| Embodiment 8 | No peeling off | >2.0 million times | ≤40 | Smooth surface | No | 34 |
| Embodiment 9 | No peeling off | >2.0 million times | ≤30 | Smooth surface | No | 28 |
| Embodiment 10 | No peeling off | >2.0 million times | ≤45 | Smooth surface | No | 50 |
| Embodiment 11 | No peeling off | >2.0 million times | ≤50 | Smooth surface | No | 80 |
| Embodiment 12 | No peeling off | >2.0 million times | ≤40 | Smooth surface | No | 40 |
| Embodiment 13 | No peeling off | >2.0 million times | ≤30 | Smooth surface | No | 30 |
| Comparative object 2 | A little peeling off | >1.7 million times | ≤10 | Smooth surface | Well | \ |

In which,

P (phosphor) dissolution test: placing coating samples with fixed area into boiling water to boil for 10 min, and then measuring the dissolved P in the boiling water by means of ICP, which is converted to obtain the results.

Appearance: surfaces being sticky or not, touching the surfaces by hands to determine whether they are sticky.

As can be seen from the Table 4, the performances of the chromium-free coatings of the embodiments 7~13 are all excellent, and the amounts of dissolved-out P separation are lower, so that problem of sticky coatings is overcome.

It can be seen from embodiments 1~13 that by implement of the present invention, chromium-free insulation coatings for non-oriented silicon steel with excellent performance can be obtained, to replace existing chromium-containing coatings. The coatings of the invention completely meet EU environment protection requirements in production of silicon steel products.

What is claimed is:

1. A chromium-free coating composition comprising, in parts by weight:

| | |
|---|---|
| metal dihydrogen phosphate salt | 100 parts; |
| epoxy resin | 10~60 parts; |
| isooctanoate metal salt drier | 0.001~10 parts; |
| organic solvent | 0.001~100 parts; |
| pure water | 60~2000 parts; | characterized in that the isooctanoate metal salt drier is potassium, manganese, sodium, nickel, copper, cerium, zinc, zirconium or calcium isooctanoate salt.

2. The chromium-free coating composition as defined in claim 1, characterized in that said metal dihydrogen phosphate salt is $Al(H_2PO_4)_3$, $Mg(H_2PO_4)_2$, $Ca(H_2PO_2$ or $Zn(H_2PO_4)_2$.

3. The chromium-free coating composition as defined in claim 2, characterized in that in the $Al(H_2PO_4)_3$, molar ratio of $Al_2O_3$ to $H_3PO_4$ is 0.14~0.20:1.

4. The chromium-free coating composition as defined in claim 2, characterized in that in the $Mg(H_2PO_4)_2$, $Ca(H_2PO_4)_2$ or $Zn(H_2PO_4)_2$, molar ratio of MgO, CaO, or ZnO to $H_3PO_4$ is 0.40~0.60:1.

5. The chromium-free coating composition as defined in claim 1, characterized in that the epoxy resin is water-soluble epoxy resin or epoxy resin emulsion.

6. The chromium-free coating composition as defined in claim 1, characterized in that the organic solvent is glycol or glycerol.

7. A chromium-free coating composition comprising, in parts by weight:

| | |
|---|---|
| metal dihydrogen phosphate salt | 100 parts; |
| epoxy resin | 10~60 parts; |
| naphthenate drier or isooctanoate metal salt drier | 5~8 parts; |
| organic solvent | 0.001~100 parts; |
| pure water | 60~2000 parts. |

8. The chromium-free coating composition as defined in claim 7, characterized in that said metal dihydrogen phosphate salt is $Al(H_2PO_4)_3$, $Mg(H_2PO_4)_2$, $Ca(H_2PO_4)_2$ or $Zn(H_2PO_4)_2$.

9. The chromium-free coating composition as defined in claim 8, characterized in that in the $Al(H_2PO_4)_3$, molar ratio of $Al_2O_3$ to $H_3PO_4$ is 0.14~0.20:1.

10. The chromium-free coating composition as defined in claim 8, characterized in that in the $Mg(H_2PO_4)_2$, $Ca(H_2PO_4)_2$ or $Zn(H_2PO_4)_2$, molar ratio of MgO, CaO, or ZnO to $H_3PO_4$ is 0.40~0.60:1.

11. The chromium-free coating composition as defined in claim 7, characterized in that the epoxy resin is water-soluble epoxy resin or epoxy resin emulsion.

12. The chromium-free coating composition as defined in claim 7, the coating material comprising naphthenate drier, characterized in that the naphthenate drier is cobalt, manganese, iron, copper, cerium, zinc, calcium, potassium, barium or nickel naphthenate.

13. The chromium-free coating composition as defined in claim 7, the coating material comprising isooctanoate metal salt drier, characterized in that the isooctanoate metal salt drier is potassium, manganese, sodium, nickel, copper, cerium, zinc, zirconium or calcium isooctanoate salt.

14. The chromium-free coating composition as defined in claim 7, characterized in that the organic solvent is glycol or glycerol.

* * * * *